United States Patent
Puttabasappa et al.

(10) Patent No.: US 9,489,646 B2
(45) Date of Patent: Nov. 8, 2016

(54) APPROACH FOR INTELLIGENTLY PARSING NON-CONFORMANT ENCODED DOMAIN NAMES AND GENERATING A CONFORMING DOMAIN HIERARCHY

(75) Inventors: Ramesha Nellikere Puttabasappa, Bangalore (IN); Conrad Bruce Beaulieu, Duluth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 333 days.

(21) Appl. No.: 13/226,310

(22) Filed: Sep. 6, 2011

(65) Prior Publication Data

US 2013/0060794 A1    Mar. 7, 2013

(51) Int. Cl.
*G06Q 10/06* (2012.01)
*G06F 17/27* (2006.01)
*G06F 17/30* (2006.01)
*G06Q 10/00* (2012.01)
*H04L 12/28* (2006.01)

(52) U.S. Cl.
CPC ......... *G06Q 10/06* (2013.01); *G06F 17/2705* (2013.01); *G06F 17/30194* (2013.01); *G06Q 10/00* (2013.01); *H04L 2012/285* (2013.01)

(58) Field of Classification Search
CPC ................... G06Q 10/06; G06Q 10/00
See application file for complete search history.

(56) References Cited

U.S. PATENT DOCUMENTS

| | | | |
|---|---|---|---|
| 7,917,354 B2 | 3/2011 | Ceusters et al. | |
| 2005/0210149 A1* | 9/2005 | Kimball | 709/245 |
| 2010/0023997 A1 | 1/2010 | Hu et al. | |
| 2010/0050173 A1* | 2/2010 | Hensbergen | 718/1 |

* cited by examiner

*Primary Examiner* — Usmaan Saeed
*Assistant Examiner* — Paul Kim
(74) *Attorney, Agent, or Firm* — Seager, Tufte & Wickhem, LLP

(57) ABSTRACT

An approach for building management, energy management and facility management systems and particularly to data models representing building and operational configurations of the systems. More particularly, the disclosure pertains to standard data models for representing these configurations and their transformation from non-standard form into a standard form defined by domain ontologies. The transformation is of ad hoc and disparate technical reference information into an ontologically correct and validated complex hierarchy with an associated set of integrated digital information.

7 Claims, 6 Drawing Sheets

| Point Name | Equipment | Point Role |
|---|---|---|
| Ah4MaTemp | Ah4 (Air Handling Unit) | Mixed Air Temperature |
| AC183VAV36_DA_POS | AC183 (Air Handling Unit) | Damper Position |
| VAV_1_22_10_SpaceTemp | VAV_1_22_10(VAV) | Space Temperature |

| Equipment Prefix | Equipment Name | Point Role Prefix | Point Role |
|---|---|---|---|
| AHU | Air Handling Unit | SAT | Supply Air Temperature |
| BOIL | Boiler | RAT | Return Air Temperature |
| CH | Chiller | DaPos | Damper Position |

FIGURE 1

| Point Name | Equipment | Point Role |
|---|---|---|
| Ah4MaTemp | Ah4 (Air Handling Unit) | Mixed Air Temperature |
| AC183VAV36_DA_POS | AC183 (Air Handling Unit) | Damper Position |
| VAV_1_22_10_SpaceTemp | VAV_1_22_10 (VAV) | Space Temperature |

FIGURE 4

| Pilot Sites | Number of points | Accuracy of parsing | Time Saved |
|---|---|---|---|
| Site 1 | 1200 | 80 percent | 40 hours |
| Site 2 | 780 | 90 percent | 30 hours |
| Site 3 | 1430 | 75 percent | 50 hours |

FIGURE 6

APPROACH FOR INTELLIGENTLY PARSING NON-CONFORMANT ENCODED DOMAIN NAMES AND GENERATING A CONFORMING DOMAIN HIERARCHY

BACKGROUND

The present disclosure pertains to building management, energy management and facility management systems and particularly to data models representing building and operational configurations of the systems. More particularly, the disclosure pertains to standard data models for representing these configurations and their transformation from non-standard form into a standard form defined by domain ontologies. The transformation is of ad hoc and disparate technical reference information into an ontologically correct and validated complex hierarchy with an associated set of integrated digital information.

SUMMARY

The disclosure reveals an approach with one example of many hierarchical domain entity relationships for parsing and providing a site hierarchy based on domain ontologies related to a building. The approach may incorporate a parser, a classifier, an organizer, a building management system database extract of point names and a domain hierarchy database in a system. With the parser, a prefix may be extracted from a point name from a list of names. A prefix to equipment type mapping may be sought in a lexicon by the classifier. If such mapping is found, then the mapping may be stored in the domain hierarchy database. A suffix may be extracted from the point name. A suffix to point role mapping may be sought in the lexicon. If such mapping is found, then the point name may be associated to a point role by the classifier. Then a relationship may be created between an equipment point name and point roles by the organizer to build the site hierarchy.

BRIEF DESCRIPTION OF THE DRAWING

FIG. 1 is a diagram of a table incorporating an illustrative example of a lexicon used to parse point names and classify them;

FIG. 4 is a diagram of a table of an illustrative example of a point name to equipment and point role mapping;

FIG. 6 is a diagram of a table incorporating test sites for evaluating the efficiency of the present system approach.

DESCRIPTION

Figure 2:
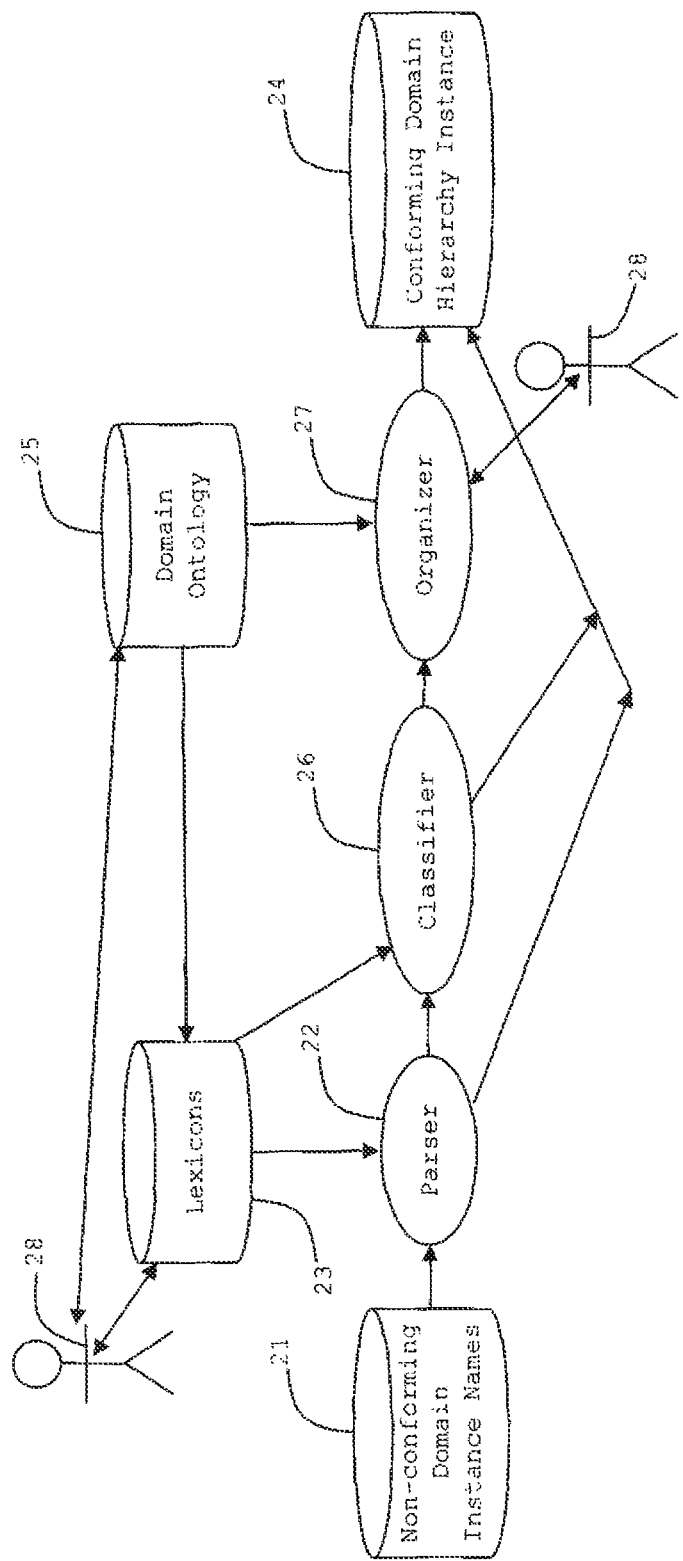
FIG. 2 is a diagram of the components in the system.

The following definitions may help one to understand the issue and a solution within a present approach. "Ontology" may be a rigorous and exhaustive organization of domain knowledge that is hierarchical and contains virtually all of the relevant concepts, properties and their relationships in the domain. In computer science and information science, an ontology may be a formal representation of the knowledge in a tool-based environment with various representational transformations to drive inter-operability or knowledge sharing such as a semantic web. Industry standards define in part important aspects of a domain ontology.

A "point name" may be a logical name assigned to sensors, actuators and equipment values in an HVAC system in a building control domain. Point names are assigned by building domain configuration experts to entities in a building system having a meaningful value in a domain system. Point names may contain underscores, numerals, spaces, and fixed or mixed-case alpha and numeric characters. A point name may include multiple encoded pieces of information which can vary in its encoding at the same building site. The following items may be some example point names: "Ah4MaTemp", "AC183VAV36_DA_POS", and "VAV_1_22_10_SpaceTemp".

A "point role" or "point type" may be an application level type for a unique value from the building control system that includes an understanding of how the unique value is used in a control system context.

A building "domain" may include any one of a number of systems that are required to use the building for its intended purpose based on its design. Building domains and those included in this disclosure include and are not limited to: Heating, Ventilation and Air Conditioning (HVAC), lighting, access control, security—intrusion, security—video surveillance, security—emergency egress, occupancy, facility management, energy co-generation, audio—paging, audio—emergency annunciation, life safety—fire detection and suppression, wired and wireless digital communications, computer center, projection or presentation system, asset management, electrical service, gas service, water service, clean rooms, chemical or biological hood areas, hazard zone management, and inventory management. Virtually all of these domains have some type of management system tracking their operation, maintenance and financial burden.

A technical or commercial issue may be noted. Many of the building management systems do not necessarily have a standard data model to represent the building configuration or the domain of interest. The systems typically follow standards or have proprietary definitions with limited means to assign meta-data to user defined names for equipment, sensors and actuators. Point names may be assigned to various building control points during a configuration or re-configuration process. A technician who performs an initial configuration may be very knowledgeable about the building structure, the equipment and the layout of the sensing in the building. This information may be encoded in various forms in the system through multiple configuration tools. The tools may include an attributed building layout diagram, building operational graphics, integration point mappings from various subsystems and equipment information. Once the control system is configured, the configuring technician or installation control's engineer is typically not responsible for the operation and maintenance of the system. The original understanding of the whole building control system context may be lost once it is operational.

Maintenance staff, energy analysts and facility managers may spend significant time to understand the point names and their relationship with other entities like equipment and localities. Often, buildings may have thousands of point names and associating point names to equipment and the building site hierarchy and a control application may take significant amounts of time (up to 100 hours), and be repeated over and over.

A solution may be an approach of generating a user-friendly hierarchy tree which depicts the building hierarchy, equipment information, and subsystem or domain information and then associates the ontology-based point roles with the point names in a location context. The present solution may use the building domain ontology and experiencedeveloped lexicons, including building specific context additions, to identify the point role, parent entity relationships such as equipment, locality and their relationship to the point names.

A point name may be abstractly defined as <EquipmentPrefix><Delimiter><PointRolePrefix>. Building location <Location> may also be included in the point name.

A table 10 of a sample lexicon for equipment and point roles in FIG. 1 shows an example of a lexicon used to process point names. A lexicon may incorporate a list of terms relating to a particular subject. "Parse" may mean to analyze (e.g., a string of characters for sub-strings) in order to associate groups of characters with the syntactic units of an underlying name structure.

<Equipment Prefix> may be normally used by a site technician to name the equipment type. Equipment type may be based on a building control ontology concept. Similarly, a point role prefix may be used to represent the role that a value is playing in the control system. A point role may be an ontology concept with many relationships and properties.

Table 10 shows headings of equipment prefix for column 11, equipment name for column 12, point role prefix for column 13 and point role for column 14. Row 15 lists AHU for equipment prefix of column 11, air handling unit for equipment name of column 12, SAT for point role prefix of column 13 and supply air temperature for point role of column 14. Row 16 lists BOIL, boiler, RAT and return air temperature for columns 11, 12, 13 and 14, respectively. Another example is row 17 listing CH, chiller, DaPos and damper position for columns 11, 12, 13 and 14, respectively. Other equipment and point roles may be designated similarly.

FIG. 2 is a diagram of the components associated with the system. A non-conforming domain instance names database 21 as extracted from a building management system database may have a list of instance names. A parser 22 may take the names as inputs from database 21 and use the lexicons 23 and a domain ontology database 25 to extract information along with the classifier 26 using the information as a catalyst to identify a sensor's parent, point role, and having an organizer 27 to determine the relationship between the equipment and the point role. The conforming domain hierarchy instance database or domain hierarchy database 24 may store virtually all of the possible mapping patterns between equipment-to-point and point-to-point roles. Database 24 may be built based on learning over a period of time. An output generated by an organizer 27 may be according to a domain ontology. The output of organizer 27 may be placed in a form for a conforming domain hierarchy instance in database 24. A person 28 may interact with databases 23 and 27. Items 21-27 may be components of a processor or computer. The processor or computer may have a user interface.

Figure 3:
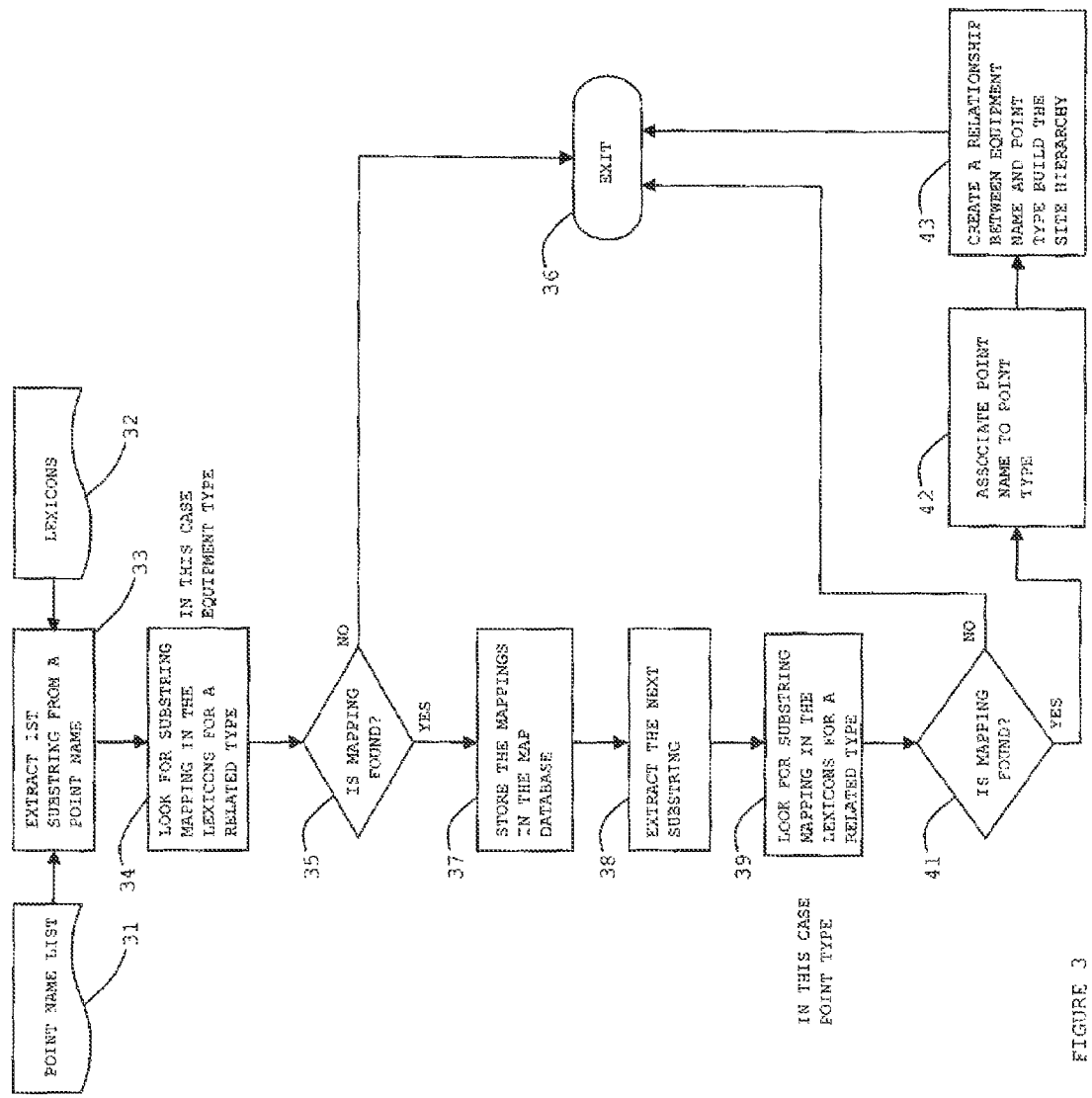
FIG. 3 is a diagram of an example approach for parsing, classifying and organizing.

FIG. 3 is a flow diagram of a system process. The flow diagram shows the steps involved in extracting the equipment type and point role from the point name. A point name list 31 from database 21 and lexicons 32 from database 23 may be available to an item 33 which can extract a 1st substring from a point name. At item 34, a substring mapping may be looked for in lexicons 32 for a related type. In this case, it may be an equipment type. A question of whether the mapping is found may be asked at item 35. If an answer to the question is no, then an exit from the process may be made at an item 36. If the answer to the question is yes, then at an item 37, the mapping or mappings may be stored in a database. A next substring may be extracted at item 38. At item 39, a substring mapping may be looked for in lexicons 32 for a related type. A question of whether the mapping is found may be asked at item 41. If an answer to the question is no, then an exit from the flow may be made at item 36. If the answer to the question is yes, then at an item 42, a point name may be associated to a point type. A relationship may be created between the equipment name and the point type to build a site hierarchy at item 43. After item 43, an exit from the flow may be made at item 36. The approach in the diagram of FIG. 3 may be effected with a processor or computer.

There may be a particular aspect to the present approach. Using ontology in the building domain may help analysts to understand the building and make the analysis easier. The use of ontology to drive a rule-based system 22 (parser), 26 (classifier) and 27 (organizer) to dynamically assign known types to un-typed and coded information, and the point name, may be a characteristic of the present approach. The approach may be used in products like optimization services and remote services to auto-configure or map point values to known types.

Another approach may disclose the access control strategy based on ontology rules. In that approach, the ontology rules may be defined based on the relationship between the user and facility, and their role in the organization.

The present approach appears to differ from the other approach because it may define relationships between building control values and equipment in the context of a locality with domain meta-data, and create a hierarchy based on the information available in the building management systems.

The parsing 22, classification 26 and organization 27 may depend on the ontology—what can be partially encoded in the point name and the elements' relationships, the lexicon which includes common abbreviations for ontology concepts, and the building hierarchy as extracted from a CAD diagram. Virtually all sources of building information may be leveraged to support the building domain name analysis process. The parsing may be informed by the location of a token, the probability of a match to a lexicon abbreviation, the presence of clear delimiters, and the ontology information available related to domain names. One may further improve the parsing efficiency by iteratively improving the lexicons of commonly used prefixes and suffixes for point names. Human interaction 28 may be provided at lexicons 23 and as part of the organization step and in the domain ontology over time to improve system efficiency and domain definition completeness over time. Human interaction 28 may be provided at organizer 27.

Logical inferences may be made about the elements of a domain name in much the same way as a human reader makes inferences about a domain name based on the reader's own implicit rules gained after many years of building domain experience.

One advantage of the present approach is that it may be re-used across languages with language specific lexicons.

A table 50 in FIG. 4 shows a point name 51 to equipment 52/point role 14 mapping. The point name to equipment/point role mapping may indicate how equipment 52 and point roles 14 can be mapped after applying parsing logic. Table 50 shows examples of point name 51 to equipment 52/point role 14 mapping. The point name 51 to equipment 52/point role 14 mapping may indicate how equipment 52 and point roles 14 can be mapped after applying parsing logic. Table 50 also shows headings of "point name" for column 51, "equipment" for column 52 and "point role" for column 53. Row 54 lists "Ah4MaTemp" for a point name of column 51, "Ah4 (air Handling Unit)" for equipment of column 52 and "Mixed Air Temperature" for a point role of column 53. Row 55 lists "AC183VAV36_DA_PO", "AC183 (Air Handling Unit)" and "Damper Position" for columns 51, 52 and 53, respectively. Another example is row 56 listing "VAV_1_22_10_SpaceTemp", "VAV_1_22_10 (VAV)" and "Space Temperature" for columns 51, 52 and 53, respectively. Other illustrative examples point name to equipment/point role may be mapped after application of parsing logic.

Figure 5:
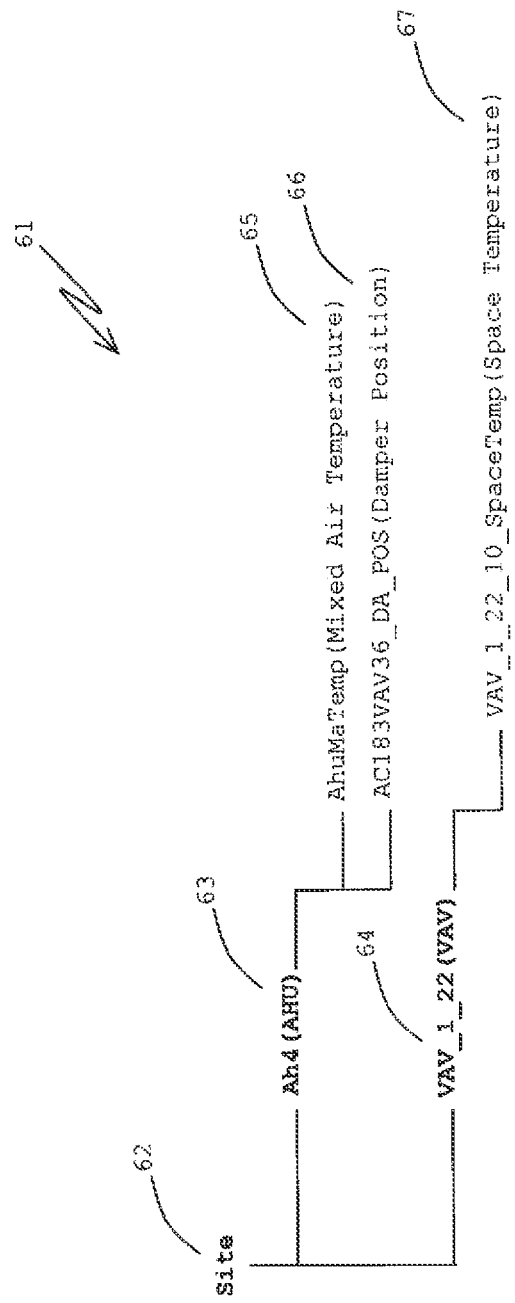
FIG. 5 is a diagram of an example site hierarchy resulting from processing the items listed in the table of FIG. 4.

FIG. 5 shows a site hierarchy 61 which can be built after applying the system for the points listed in table 50 of FIG. 4. Site hierarchy 61 may be built after the application of the system for the points listed in table 50 of FIG. 4. From a "Site" 62, there may be levels of an "Ah4(AHU)" 63 and a "VAV_1_22(VAV)" 64. From level 63, there may be a level "AhuMaTemp(Mixed Air Temperature)" 65 and a level "AC183VA36_DA_POS(Damper Position)" 66. From level 64, there may be a level "VAV_1_22_10_SpaceTemp(Space Temperature)" 67.

The present solution may be used in existing building control system pilot sites. The results may provide prospective benefits. A table 70 in FIG. 6 shows the results of the pilot sites. A value proposition may be noted. Typically, an analyst may take 80 to 100 hours to validate, identify a right relationship and build the site hierarchy for a single site configuration. The present approach may reduce the analyst's efforts 25 to 40 hours. The savings in time is especially significant as the number of sites grows and the efficiency of translation increases over time.

Table 70 may elaborate a value of the present approach in terms of an analyst's time to validate, identify the right relationship, and build the site hierarchy for a single site configuration. Several sites were tested, as indicated under a heading for "pilot sites" of a column 71. The "number of points" is indicated by a heading for a column 72. An "accuracy of parsing" is indicated by a heading for a column 73. "Time saved" with the present approach over a related art approach is indicated by a column 74. A row 75 may indicate Site 1 in column 71, 1200 in column 72, 80 percent in column 73 and 40 hours in column 74. A row 76 may indicate Site 2 in column 71, 780 in column 72, 90 percent in column 73 and 30 hours in column 74. A row 77 may indicate Site 3 in column 71, 1430 in column 72, 75 percent in column 73 and 50 hours in column 74.

A recap in view of FIGS. 2 and 3 may be noted. A parsing system may incorporate a parser 22, a classifier 26 connected to the parser 22, and an organizer 27 connected to classifier 26. A lexicon database 23, 32 may be connected to the parser 22 and a domain hierarchy database 24 may be connected to the organizer 27. The parser 22, classifier 26 and/or the organizer 27 may be a component of a processor.

The parsing system may further incorporate a non-conforming domain instance names database 21 connected to the parser 22. Parser 22 may extract 33 a first substring from a point name from the non-conforming domain instance names database 21. Parser 22 may look 34 for a mapping of the substring in the lexicon database 23, 32. If parser 22 does not necessarily find 35 a mapping of the substring in the lexicon database 23, 32, then the parser 22 may stop 36. Parser 22 may find 35 a mapping of the substring in the lexicon database 23, 32.

The parsing system may further incorporate a domain hierarchy database 24 connected to the parser 22. The parser 22 may store 37 the mapping of the substring in the domain hierarchy database 24. Parser 22 may extract 38 another substring a point name from the non-conforming domain instance names database 21. Parser 22 may look for a mapping 39 of the other substring in the lexicon database 23, 32. If parser 22 does not necessarily find a mapping 39 of the other substring in the lexicon database 23, 32, then the parser may stop 36.

The parser 22 may find 41 a substring mapping in the lexicon database 23, 32. Parser 22 may associate 42 the point name to a point type and parser 22 may create 43 a relationship between an equipment name and the point type to build a site hierarchy.

An approach for parsing and providing a site hierarchy may incorporate providing a point name list 31 from a non-conforming domain instance names database 21, providing one or more lexicons 23, 32, selecting a point name from the point name list 31, extracting 33 a first substring from the point name, and looking 34 for a mapping of the substring in the one or more lexicons 23, 32. The providing, selecting, extracting and/or looking may be performed with a processor. If the mapping 35 of the substring is not necessarily found in the one or more lexicons 23, 32, then one may exit 36 the approach.

The approach may further incorporate finding the mapping 35 of the substring in the one or more lexicons 23, 32. The approach may also incorporate providing a domain hierarchy database 24, storing 37 the mapping of the substring in the domain hierarchy database 24, extracting 38 a next substring from the point name, and looking 39 for a mapping of the substring in the one or more lexicons 23, 32. If the substring mapping 35 is not necessarily found in the one or more lexicons, then one may exit 36 the system.

The approach may further incorporate finding 35 the mapping of the next substring in the one or more lexicons 23, 32. The approach may also incorporate associating 42 the point name to a point type, creating 43 a relationship between an equipment name and the point type, and building 43 a site hierarchy from the relationship between the equipment name and the point type.

A method for parsing and building a site hierarchy may incorporate providing a parser 22, a first database connected to parser 22, a classifier 26 connected to the parser, a lexicon source 23, 32 connected to the parser and the classifier, and an organizer 27 connected to the parser, classifier and a second database.

The method may further incorporate using the parser 22 to assist in selecting a point name from a point name list 31, and finding 34 a substring mapping in the lexicon source 23, 32. The first database may be a non-conforming domain instance names database 21, and the second database may be a domain hierarchy database 24. Parser 22 may be a component of a processor.

The method may further incorporate storing 37 the substring mapping in the domain hierarchy database 24, extracting 33 a next substring from the point name, and finding 39 a next substring mapping in the lexicon source. The method may also incorporate associating 42 the point name to a point type, creating 43 a relationship between an equipment name and the point type, and building 44 a site hierarchy in the domain hierarchy database 24 from the relationship.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A system for transforming entries in a non-conforming building domain instance names database of a building management system into conforming entries in a building domain hierarchy database comprising:
   a processor;
   a building management system comprising:
      a building domain hierarchy database;
      a building management system database comprising point names;
      a non-conforming building domain instance names database comprising point names, wherein the point names either conform to an ontology other than a building domain ontology or conform to no ontology;
      an extraction module including the processor programmed to identify non-conforming domain instance point names within the building management system database and to transfer non-conforming building domain instance names within the building management system database to the non-conforming building domain instance names database;
      a parser connected to the non-conforming domain instance names database;
   a classifier connected to the parser; and
   an organizer connected to the classifier;
   a lexicon database connected to the parser; and
   the building domain hierarchy database connected to the organizer; and
   wherein:
      the parser, classifier and/or the organizer is a component of the processor programmed to perform those functions;
   wherein:
      the parser extracts a first substring from a point name from the non-conforming domain instance names database;
      the parser looks for a mapping of the substring in the lexicon database; and
   the parser associates the point name to a point type;
      the parser creates a relationship between an equipment name and the point type; and
      the parser generates a transformed point name conforming to the domain ontology; and
      the parser stores the transformed point name in the building domain hierarchy database.

2. The system of claim 1, wherein if the parser does not find a mapping of the substring in the lexicon database, then the parser stops.

3. The system of claim 1, wherein the parser finds a mapping of the substring in the lexicon database.

4. The system of claim 3, wherein:
   the domain hierarchy database is connected to the parser; and
   the parser stores the mapping of the substring in the domain hierarchy database.

5. The system of claim 4, wherein:
   the parser extracts another substring from the point name from the non-conforming domain instance names database; and
   the parser looks for a mapping of the other substring in the lexicon database.

6. The system of claim 5, wherein if the parser does not find a mapping of the other substring in the lexicon database, then the parser stops.

7. The system of claim 5, wherein the parser finds a substring mapping in the lexicon database.

* * * * *